(No Model.) 9 Sheets—Sheet 1.

D. W. MARMON & J. WARRINGTON.
ROLLER MILL.

No. 265,927. Patented Oct. 10, 1882.

WITNESSES.
Chas. N. Leonard.
Chas. L. Thurber.

INVENTORS.
Daniel W. Marmon,
and Jesse Warrington,
PER
C. Bradford.
ATTORNEY.

N. PETERS, Photo-Lithographer, Washington, D. C.

(No Model.) 9 Sheets—Sheet 2.

D. W. MARMON & J. WARRINGTON.
ROLLER MILL.

No. 265,927. Patented Oct. 10, 1882.

WITNESSES.
Chas. N. Leonard.
Chas. L. Thurber.

INVENTORS.
Daniel W. Marmon,
and Jesse Warrington,
PER
C. Bradford.
ATTORNEY.

(No Model.) 9 Sheets—Sheet 6.

D. W. MARMON & J. WARRINGTON.
ROLLER MILL.

No. 265,927. Patented Oct. 10, 1882.

WITNESSES.
Chas. N. Leonard.
Chas. L. Thurber.

INVENTORS.
Daniel W. Marmon,
and Jesse Warrington,
PER
C. Bradford.
ATTORNEY.

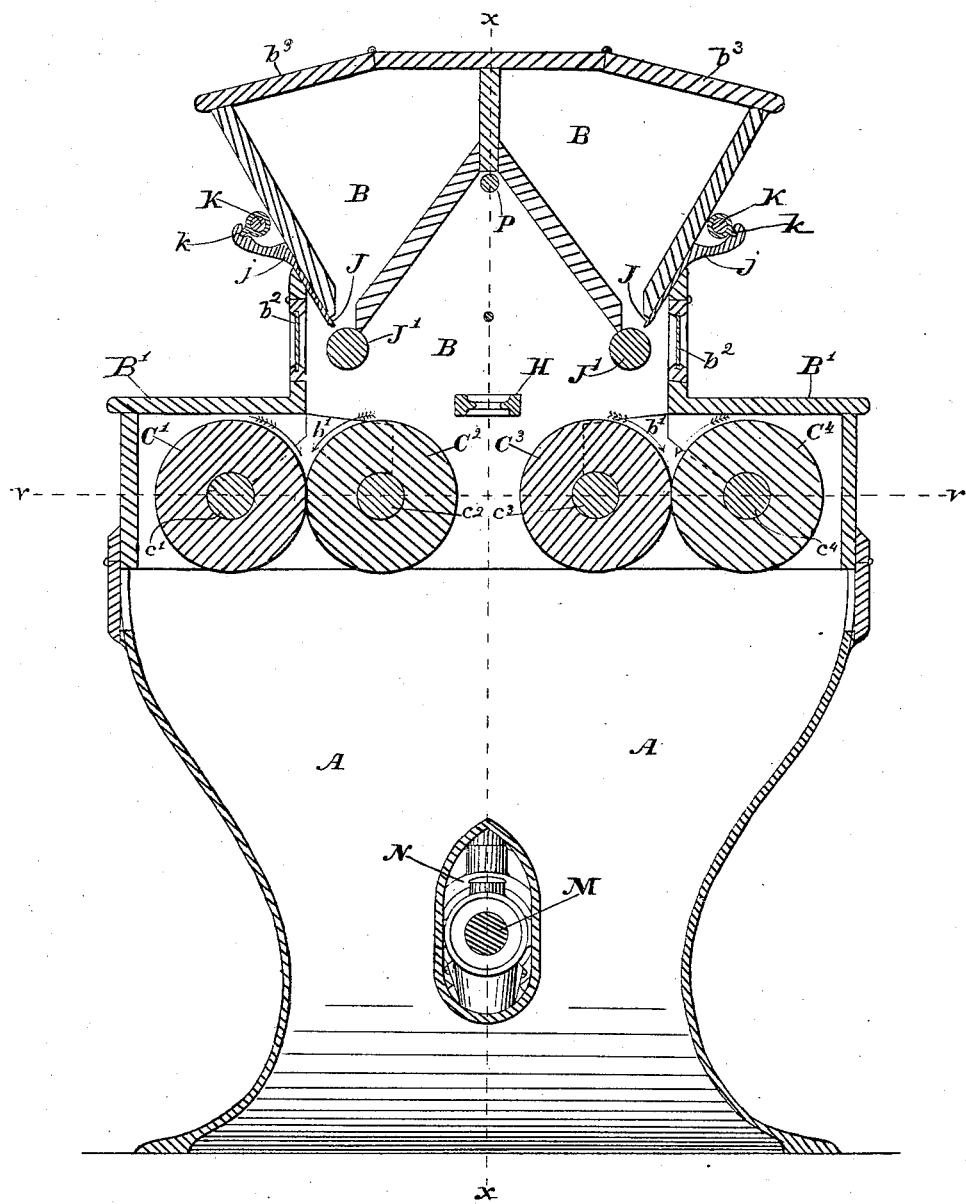

(No Model.) 9 Sheets—Sheet 8.
D. W. MARMON & J. WARRINGTON.
ROLLER MILL.
No. 265,927. Patented Oct. 10, 1882.
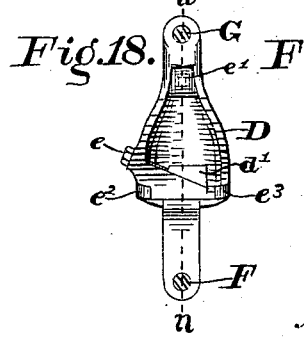
Fig. 18.
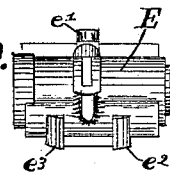
Fig. 19.
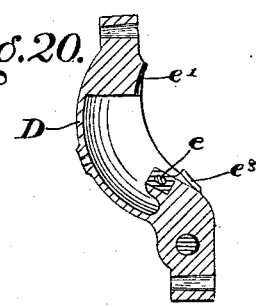
Fig. 20.
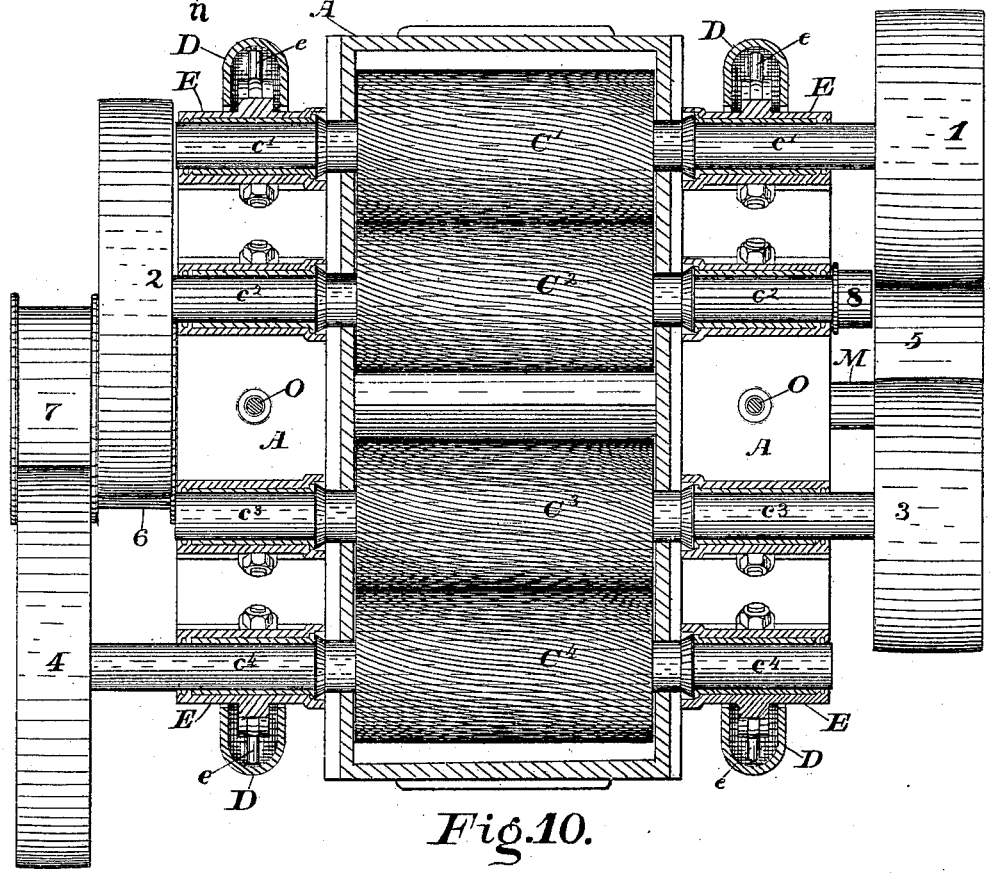
Fig. 9.
Fig. 10.
WITNESSES.
Chas. N. Leonard.
Chas. L. Thurber.
INVENTORS.
Daniel W. Marmon,
and Jesse Warrington,
PER
C. Bradford
ATTORNEY.
N. PETERS, Photo-Lithographer, Washington, D. C.

(No Model.) 9 Sheets—Sheet 9.

D. W. MARMON & J. WARRINGTON.
ROLLER MILL.

No. 265,927. Patented Oct. 10, 1882.

WITNESSES.
Chas. N. Leonard.
Chas. L. Thurber.

INVENTORS.
Daniel W. Marmon,
and Jesse Warrington,
PER
C. Bradford
ATTORNEY.

UNITED STATES PATENT OFFICE.

DANIEL W. MARMON AND JESSE WARRINGTON, OF INDIANAPOLIS, IND., ASSIGNORS TO THE NORDYKE & MARMON COMPANY, OF SAME PLACE.

ROLLER-MILL.

SPECIFICATION forming part of Letters Patent No. 265,927, dated October 10, 1882.

Application filed June 3, 1882. (No model.)

*To all whom it may concern:*

Be it known that we, DANIEL W. MARMON and JESSE WARRINGTON, of the city of Indianapolis, county of Marion, and State of Indiana, have invented certain new and useful Improvements in Roller-Mills, of which the following is a specification.

Our said invention consists in certain improvements in the construction and arrangement of parts in that class of milling apparatus known as "roller-mills," whereby it is rendered more certain and accurate in its operation, convenient in its adjustments, and perfect in its results, as will hereinafter be more fully set forth.

Figure 1:
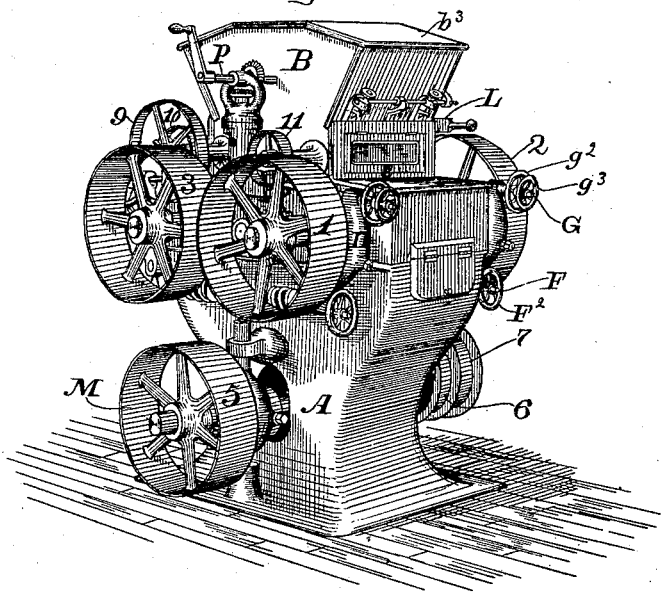
Figure 2:
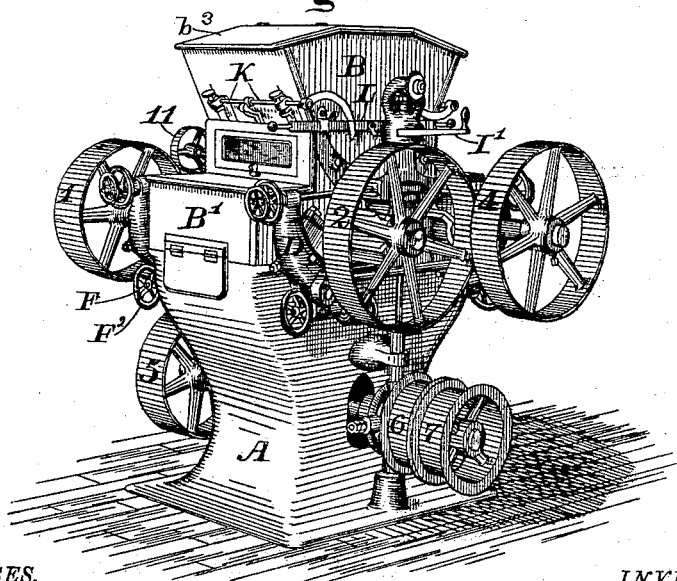
Figure 3:
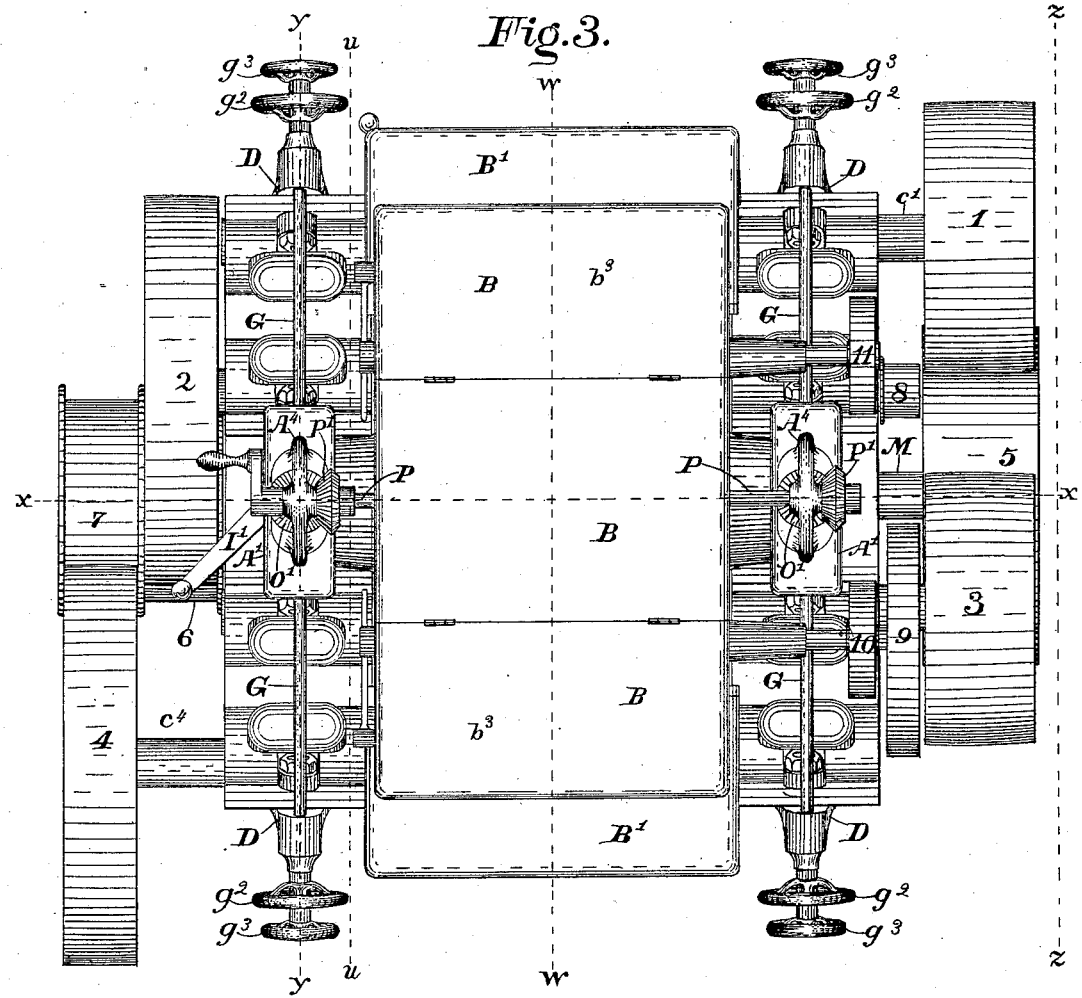
Figure 4:
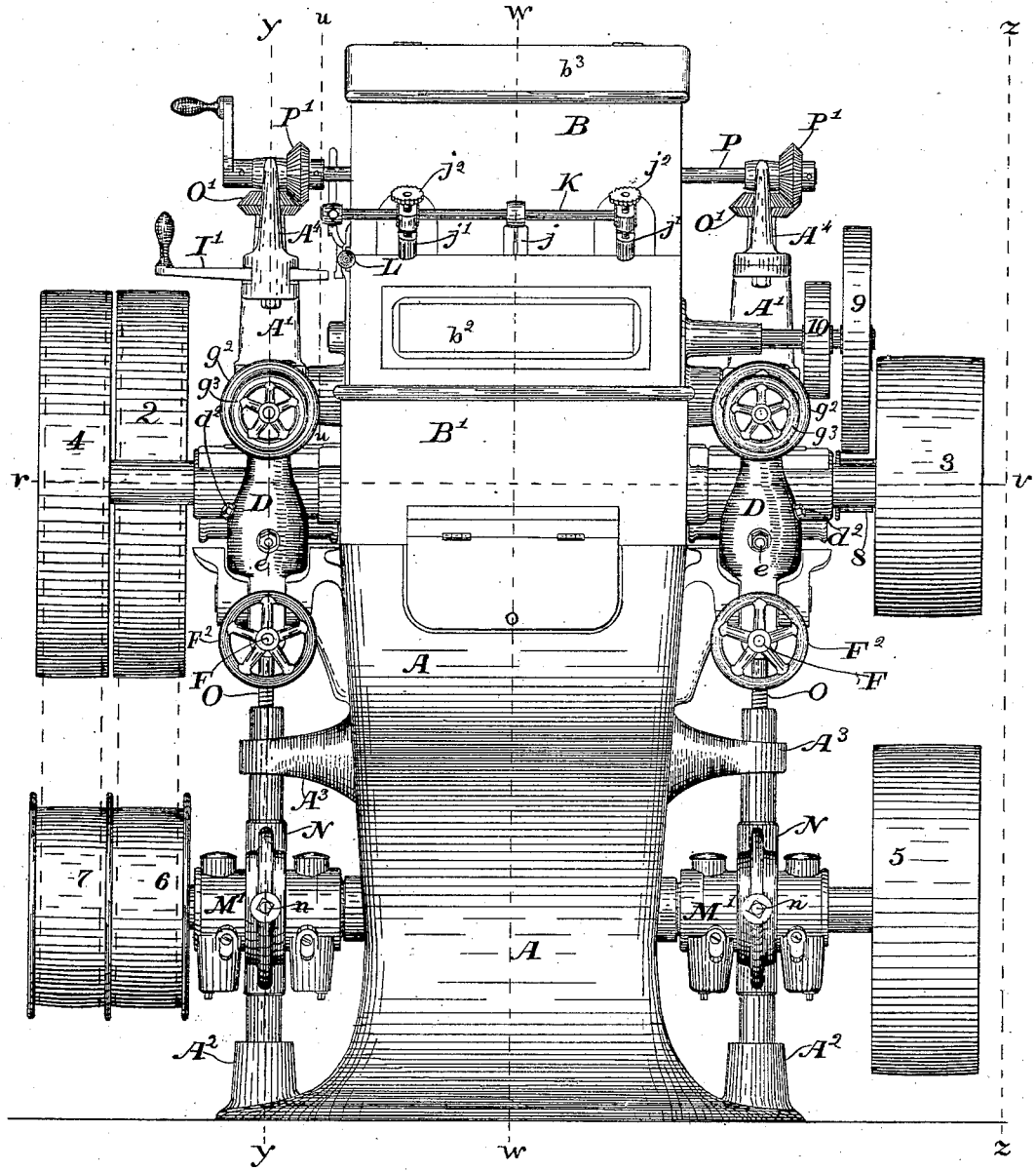
Figure 5:
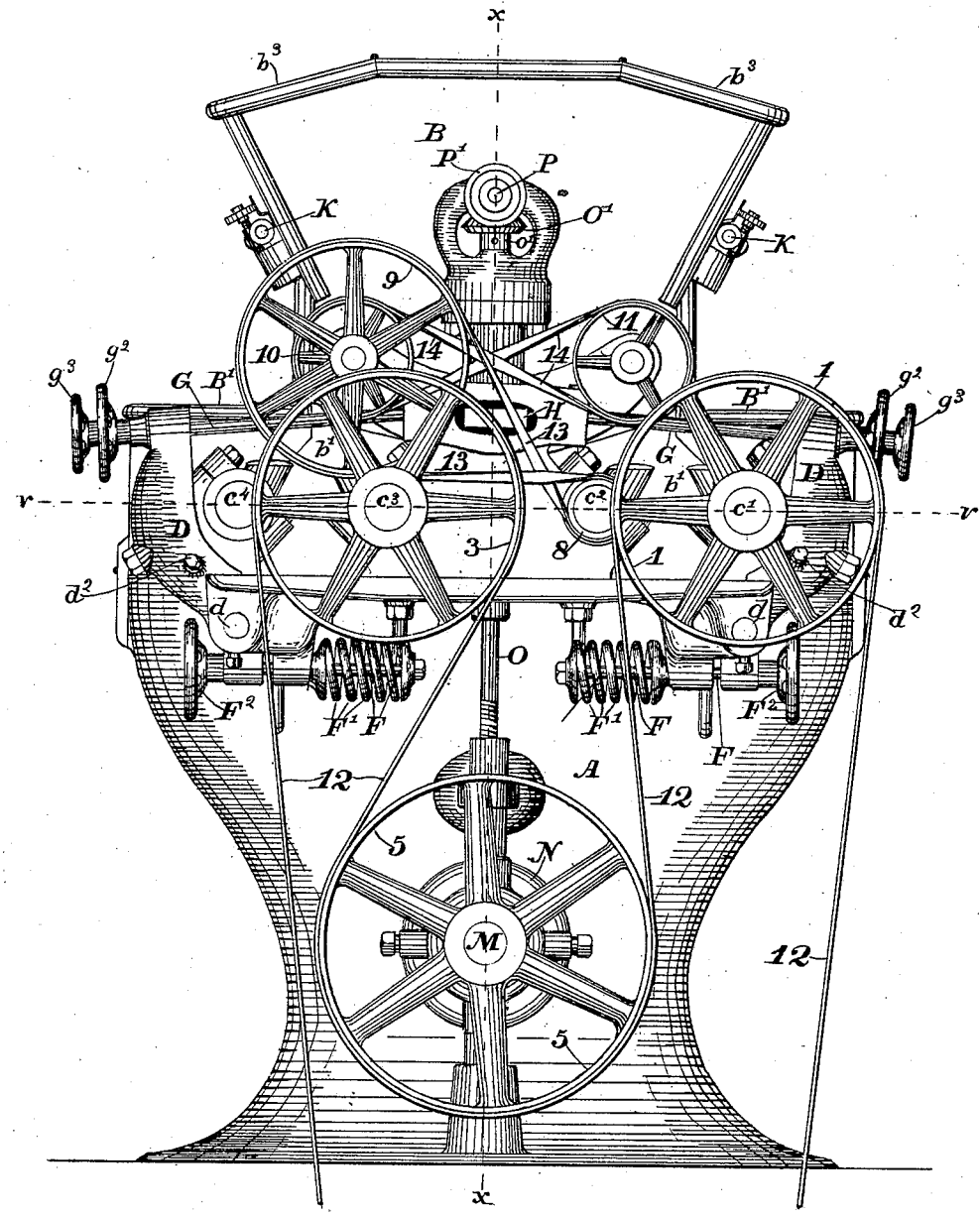
Figure 6:
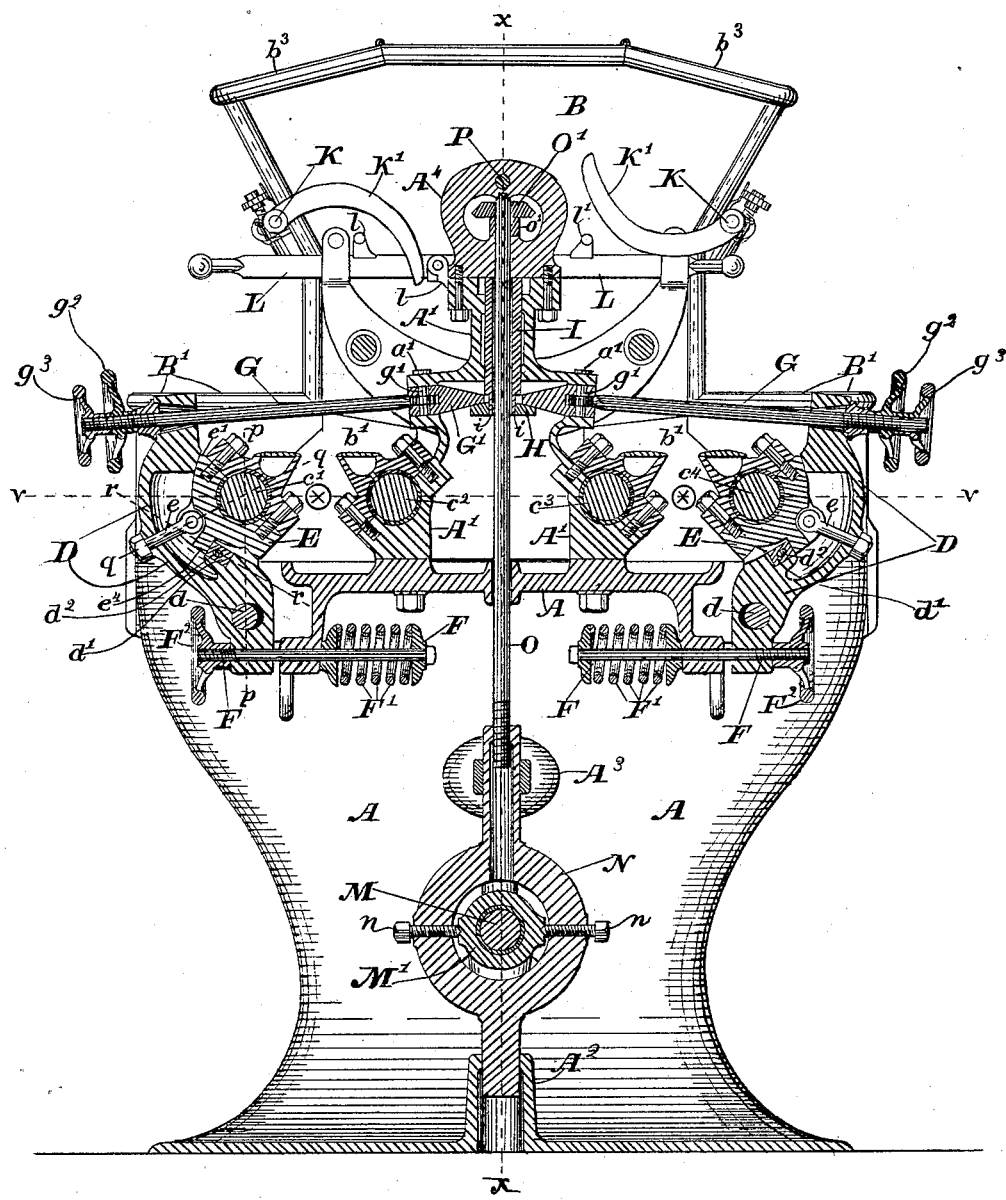
Figure 7:
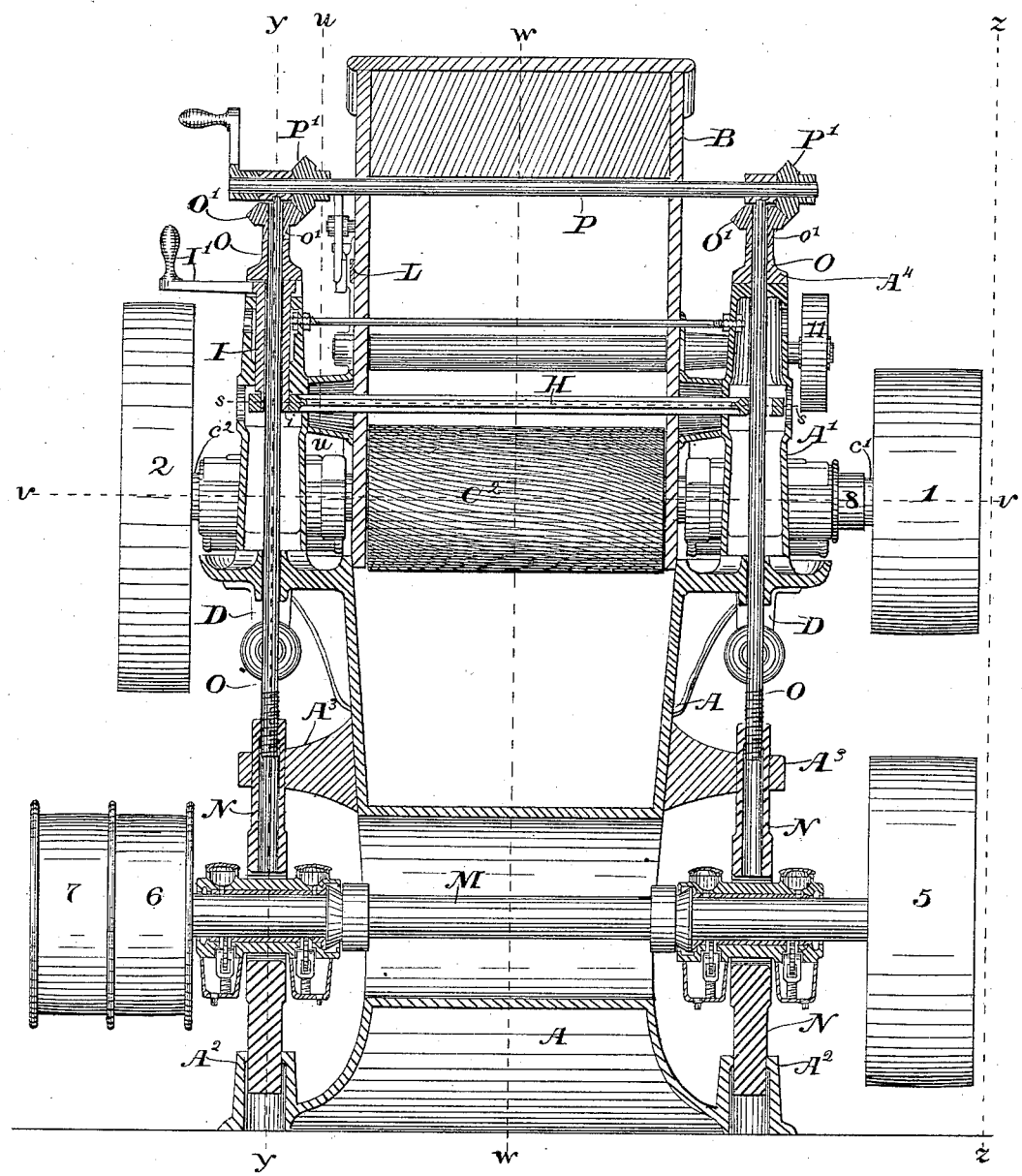
Figure 11:
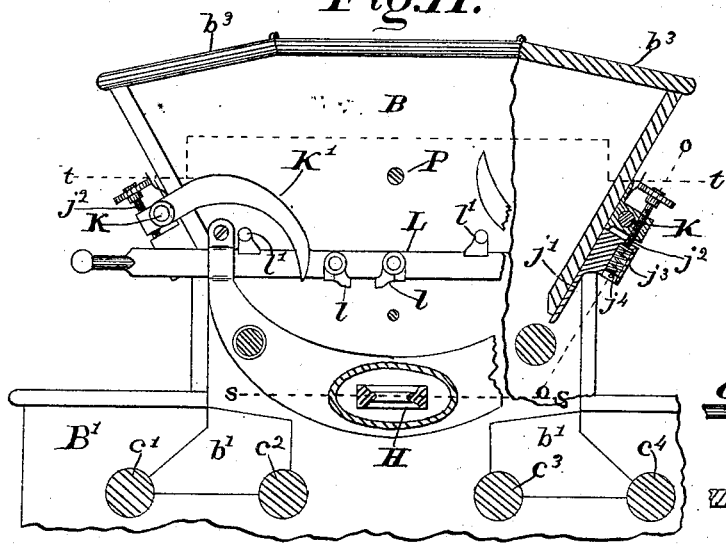
Figure 12:
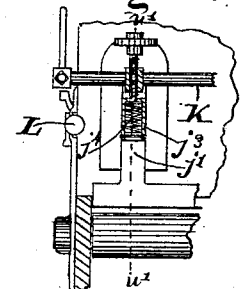
Figure 14:
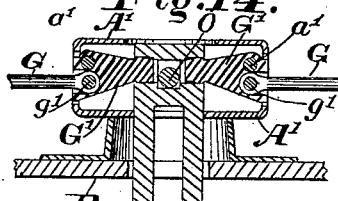
Figure 13:
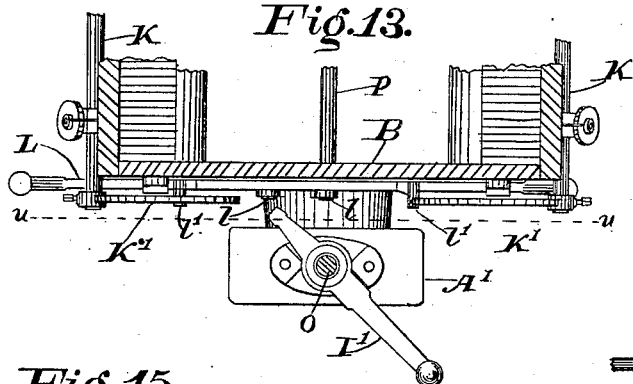
Figure 15:
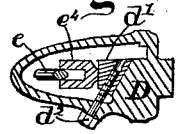
Figure 17:
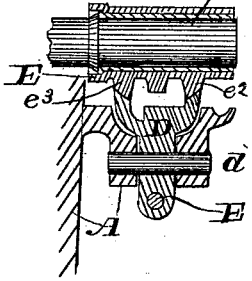
Figure 16:
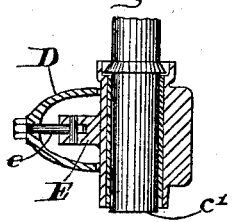

Referring to the accompanying drawings, which are made a part hereof, and on which similar letters of reference indicate similar parts, Figures 1 and 2 are perspective views, from different positions, of a mill embodying our invention; Fig. 3, a top or plan view of the same; Fig. 4, a side elevation thereof; Fig. 5, an end elevation as seen from the dotted line $z\ z$ in Figs. 3, 4, and 7, and showing the several belts on that end; Fig. 6, a transverse vertical sectional view, looking to the right from the dotted line $y\ y$ in Figs. 3, 4, and 7; Fig. 7, a longitudinal vertical section on the dotted line $x\ x$ in Figs. 3, 5, 6, and 8; Fig. 8, a transverse vertical section on the dotted line $w\ w$ in Figs. 3, 4, and 7; Fig. 9, a horizontal sectional view, looking downwardly from the dotted line $v\ v$ in Figs. 4, 5, 6, 7, and 8, the rolls and their shafts and pulleys being, however, shown in plan; Fig. 10, a section of a portion of the adjacent faces of one pair of the rolls, showing the form of the corrugations which we prefer to use on an enlarged scale; Fig. 11, an elevation of the operating mechanism of the feed-gates as seen from the dotted line $u\ u$ in Figs. 3, 4, 7, and 13, a portion, however, being a section on the dotted line $w'\ w'$ in Fig. 12; Fig. 12, a sectional view, looking inwardly from the dotted line $o\ o$ in Fig. 11; Fig. 13, a plan of the mechanism shown in Fig. 11 as seen when looking downwardly from the dotted line $t\ t$ in said figure; Fig. 14, a horizontal section on the dotted line $s\ s$ in Figs. 7 and 11 of the mechanism at that point only, the operating-handle being added by means of dotted lines; Fig. 15, a sectional view of the arm D, looking downwardly from the dotted line $r\ r$ in Fig. 6; Fig. 16, a sectional view of said arm, looking downwardly from the dotted line $q\ q$, also in Fig. 6; Fig. 17, a sectional view of said arm on the dotted line $p\ p$, also in Fig. 6; Fig. 18, a face view of the arm D when the box E is removed; Fig. 19, a view of that side of the box which rests upon the arm, and Fig. 20 a sectional view of the arm separately on the dotted line $n\ n$ in Fig. 18.

In said drawings the portions marked A A', &c., represent the castings which form the supporting frame-work of the mill; B B', &c., the hopper and other covering portions; C' $C^2$ $C^3$ $C^4$, the grinding-rolls; D, swinging arms, in which one of each pair of rolls is mounted; E, adjustable boxes mounted on said arms; F, tempering rods or screws for adjusting the maximum force of the grinding-pressure; G, distance or adjusting rods for regulating the position of the arms; H, a bar passing through the machine and connecting the two pairs of said rods; I, a cam device for operating said bar; J, the feed-gates; K, the shafts for operating them; L, a bar for operating said shafts; M, a counter-shaft; N, adjustable devices wherein the boxes for said shaft are mounted; O, the rods whereby said devices are adjusted; P, the shaft whereby said rods are connected, and the numerals 1 to 14, inclusive, the several pulleys and belts by which the machine is driven.

The frame A A', &c., is mainly a large hollow casting adapted to support the machinery of a roller-mill. Such portions as serve particular purposes will be described in connection with the parts to which they are most closely related.

The hopper and covers B B', &c., are preferably constructed of wood. The main portion B is intended to be substantially stationary, and should have doors $b^2\ b^2$ and covers $b^3\ b^3$. The side portions, B' B', are removable. Small pieces $b'\ b'$ (see especially Figs. 8 and 11) of the ends of the portion B are also removable, and this permits the removal of the central rolls, $C^2\ C^3$, without disturbing the said main portion B.

The several rolls C' $C^2$ $C^3$ $C^4$ are the crushing or grinding rolls common to roller-mills. They are respectively mounted upon the shafts $c'$ $c^2$ $c^3$ $c^4$, and are driven by the pulleys 1 2 3 4, the first and third by the main belt 12, running under the pulley 5 on the counter-shaft M, and the second and fourth by separate belts running from the pulleys 6 and 7 on said counter-shaft to said pulleys 2 and 4. (See dotted lines in Fig. 4.) It is essential that the two rolls of each pair have their axes in the same plane; but from unequal wear of journals, journal-boxes, or other causes they may, after use, vary from this plane. To correct this variation from a common plane we raise or lower the journal-boxes of either one or the other roll. As the arms D have only a movement to or from the fixed roll the boxes E are secured to them, so as to move the roll up or down on this arm, as will be presently more fully described. Preferably we move the journal box or boxes of the roll supported on the swinging arms D, but do not confine ourselves to the adjustment of these boxes, as we may arrange to adjust the boxes of the fixed roll.

The arms D are mounted upon pins $d$, which pass through their lower ends and through lugs upon the frame A. The holes in said arms through which these pins pass are elongated, (see particularly Fig 6,) so that said arm may be crowded outward somewhat by the roll supported thereby, should a hard substance come between said roll and its fellow. This could be accomplished, if desired, by several other methods, as by mounting the arm upon a swinging link or upon an eccentric, as either of these devices would permit the arm to be crowded outward, and so far such devices would be equivalent to that shown; but we prefer the elongated opening and pin, as it is simpler and in some respects better.

Preferably the boxes E are secured to the arms D so as to rest thereon at the three points $e'$ $e^2$ $e^3$, (see Figs. 6, 17, and 18,) and are held in position by the bolts $e$ and by the wedges $d'$, which pass between a projection, $e^4$, on said boxes and inclined faces on the inside of said arms. (See Figs. 6 and 15.) The points $e'$ $e^2$ $e^3$ are small spherical surfaces struck from a common center, ⊗, situated in front of center of the roll. The form of the spherical surface at point $e'$ is shown in Figs. 6, 18, and 20, and the point ⊗ from which it is struck is shown in Fig. 6. The points $e^2$ $e^3$ (shown most plainly in Figs. 17, 18, and 20) are struck from the same point. This point ⊗ is situated on a direct line from the center of the roll-journal, and lines drawn from said point to the points $e'$ $e^2$ $e^3$ would diverge similarly to lines drawn from the center to or toward the surface of a sphere. As will be readily seen by an examination of Fig. 15, the boxes may be raised or lowered by adjusting the wedges $d'$ by means of screws $d^2$, the movement of the box being the same as if pivoted at point ⊗, thereby also preventing any twisting or binding action on the roll-journals. When the adjustment is completed the box is securely held in position by tightening up the nut on the bolt $e$, which clamps the box to its seat, and also forces it firmly against the wedge $d'$. The portions of the casting A' which form the boxes for the journals $c^2$ and $c^3$ of the rolls might have a formation similar to that of the faces of the arms D, in which case said boxes might be like the boxes E and be adjustable in the same manner.

The tempering-rods F pass through the lower ends of the arms D below or beyond their pivots, through a lug or projection on the casting A, and through a coiled spring, F'. One end of each of said rods is screw-threaded, and some sort of nut (preferably a hand-wheel, F$^2$) is placed thereon. These hand-wheels are turned up until the desired amount of strain for an effective grinding pressure is brought on the arms, which holds the rolls in proper position, the tension of the springs being at all times greater at the pivots or fulcrums in one direction than the grinding resistance is in the other direction, except when a hard substance passes between the rolls, in which case the hard substance parts the rolls, forcing a further compression of the springs, the arms being permitted to move on their pivots $d$ by reason of the slots in said arms. After the hard substance is discharged the return travel of the arms is stopped by said arms coming in contact with the pivot $d$, as shown most plainly in Fig. 6. The springs, while acting to draw the lower ends of the arms supporting the movable roll inwardly toward the fixed roll of the pair, (until the arms come in contact with the pivot-pins $d$,) also operate to hold said movable roll away from said fixed roll by reason of being on the opposite sides of the fulcrums or pivot-pins from said movable roll. This spring force on the arms D, which moves their upper or roll bearing ends away from the fixed roll, acts in the same direction as the force exerted by the resistance of the material passing between the rolls. Thus the tension on the adjusting-rods G is always in the same direction, and all "lost motion" or play in the joints of the swinging arms, adjusting-rods, &c., is taken up in the same direction, both by the action of the machine itself and the grinding strain.

The adjusting-rods G are for the purpose of moving the upper ends of the arms D back and forth, and thus bringing the individual rolls of the pairs nearer to or farther from each other. Each is preferably pivoted at its inner end to a bell-crank lever, G', by a pivot, $g'$, and is provided at its outer end with a hand-nut, $g^2$, and a hand set-nut, $g^3$. The bell-crank levers are pivoted to the castings A' by pivots $a'$, and their inner ends enter notches in the bar H, and are moved by said bar as it is moved back and forth. The arms D are adjusted inward or back by turning the hand-nuts $g^2$, and the rolls supported by said arms are thus positioned nearer to or farther from their fellows.

The bar H passes through from end to end of the machine, and connects all the bell-crank levers G′, so that they can be moved simultaneously. The forcing of this bar back and forth swings the bell-crank levers G′ on their pivots, and thus operates to throw the rods G and arms D inwardly and outwardly, thereby varying the distance between the individual rolls of the several pairs at one operation. The purpose of this is to move the rolls back from grinding relation, and then return them to exactly their former position, without the delay and trouble incident to a readjustment of the machine.

The device I is journaled vertically in bearings in the castings A′, and has a cam formation, $i$, upon its lower end, which enters into an orifice in the bar H, (see Figs. 6, 7, and 14,) and thus, when turned, forces said bar back and forth. It is provided with a crank or handle, I′, by which it is operated. As this handle moves back and forth its inner end engages with the catches $l$ on the bar L, and thus through said bar also operates the feed-gates.

The feed-gates J are thin blades which run along near the feed-rolls J′, and each has upwardly-projecting arms $j$ and $j'$. One of these arms, $j$, on each gate engages with a projection, $k$, on the corresponding shaft, K, (see Fig. 8,) and the gate is thus raised and lowered by the partial rotation of said shaft. The other arms, $j'$, are arranged to come in contact with stops $j^2$, and the gate is thus thereby prevented from opening too far. These stops $j^2$ are preferably in the form of thumb-screws, as shown, so that the distance to which the gates may open may be adjustably regulated. Each of the arms $j'$ has preferably a barrel, $j^3$, upon its upper end, in which is a spring, $j^4$, having a cap, against which the stop $j^2$ rests, there being a hole in the upper end of the barrel through which the lower end of the stop passes. This spring is quite stiff, so that it holds its cap firmly against the upper end of the barrel, except when forced down in the manner which will now be described. In practice it frequently occurs that some substance gets between the feed-gate J and the feed-roll that will not pass through, but remains there obstructing the proper feeding. To let this substance pass through, it is desirable to raise the feed-gate temporarily. To do this and also return the feed-gate to its exact former position without a readjustment, we provide the yielding contact-surfaces for the stops by means of the springs $j^4$, or such known equivalent therefor—as a weight—as may be desired. These yielding surfaces are held in their fixed positions with such a force that in the action of the machine itself they are rigid surfaces or stops; but when it is desired to raise the feed-gate higher temporarily it can be done by pressing on the arm K′ sufficiently to overcome the force of the springs $j^4$, thus raising the feed-gate J. On removing the pressure from the arm K′ the feed-gate is returned to its former position by the action of said springs returning to their former position against the upper ends of the barrels $j^3$. The feed-rolls J′ are driven toward the feed-gates by the arrangement of belts shown in Fig. 5, and hereinafter described.

The shafts K have upon them, preferably at or near their centers, the projections $k$, which engage with the arms $j$ on the feed-gates, and are thus adapted to open said feed-gates or allow them to close as said shafts are partially rotated in one or the other direction. These shafts have arms K′, the weight of which operates to rotate the shafts in one direction. Said shafts are rotated in the other direction through the medium of the lugs $l'$ $l'$ on the bar L, which lift the arms K′ as said bar is moved, so that said lugs come in contact therewith.

The bar L is the medium by which the shafts K are rotated in one direction, and the feed-gates thereby permitted to close. When it is desired that the feed-gates shall be closed the bar L is moved so that the projections $l'$ shall come in contact with the arms K′, which raise the latter, thereby partially rotating the shafts K, and allowing the feed-gates to descend. When it is desired that the feed-gates shall be open the bar L is moved in the reverse direction, and the weight of the arms K′ partially rotates the shafts K in the other direction, and opens the gates. As hereinbefore stated, the handle I′ is preferably extended so as to come in contact with the catches $l$ $l$ on this bar, whereby the feed-gates are opened or closed by the same movement that throws the grinding-rolls toward or from each other. In order that this operation shall not be prevented by the independent working of the bar L, the catches $l$ $l$ are pivoted so as to swing freely toward each other, whereby the end of said handle I′ can pass between said catches at any time without regard to their positions without moving said bar. In its movement from side to side the inner end of said handle comes in contact with one of said catches, lifts and passes under it, when said catch will drop into the position shown most plainly by Fig. 11, and the handle cannot then be moved without moving the bar L, said catches being prevented from swinging outwardly by a small lug or projection attached to the bar directly behind each of them. When said handle is swung around to the limit of its movement, as shown most plainly in Fig. 13, it is entirely free from the catches, and the bar can be moved back and forth entirely independently of said handle.

The countershaft M is mounted in boxes M′, which are in turn mounted preferably by means of pivot-screws $n$ in the adjustable devices N. When this shaft is raised or lowered it loosens or tightens the several belts employed to run the grinding-rolls, as will be readily understood by an examination of the drawings. As will also be readily understood, this countershaft runs in the opposite direction from that in which the rolls C′ C³ run, and thus drives the rolls C² C⁴ also in the opposite direction to said rolls C′ C³. This causes the adjacent faces of the individual rolls forming each pair to run in the same direction, instead of oppositely, as would be the case if the rolls themselves ran in the same direction.

The devices N are formed to carry the boxes M', and are mounted and slide vertically in bearings in lugs $A^2$ $A^3$ on the casting A.

The rods O run vertically through bearings in the castings A and $A^4$, being suspended from the latter by means of a collar, $o'$, which may or may not be a part of the gear-wheels $O'$. They are screw-threaded at their lower ends and enter the upper ends of the devices N, which are also screw-threaded to receive them. These rods are thus adapted to raise and lower said devices N.

The shaft P extends through the machine from one end to the other just above the upper ends of the rods O. It has gear-wheels P' thereon, which engage with the gear-wheels $O'$ on said rods O, and is thus adapted to turn both said rods and raise or lower both the devices N simultaneously.

The several pulleys and belts operate as follows: The main belt 12 drives the pulleys 1, 3, and 5, and thus the rolls C' and $C^3$, in one direction and the counter-shaft M in the other direction. The counter-shaft, through the pulleys 6 and 7 and belts running therefrom to the pulleys 2 and 4, drives the rolls $C^2$ and $C^4$ in the opposite direction to that in which the rolls C' and $C^3$ are driven. The roll $C^2$ has on its shaft the small pulley 8, which, through the belt 13, drives the pulley 9, one of the feed-rolls J', and the pulley 10 on the same shaft therewith, and this pulley 10, through the belt 14, drives the pulley 11 and the other feed-roll. The belts running between the pulleys 6 and 2 and 7 and 4 respectively are not shown; but their positions are clearly indicated by dotted lines in Fig. 4.

The various principal operations of our said invention may be recapitulated as follows: The grain is fed through the hopper by means of the feed-gates J and feed-rolls J' to the grinding-rolls, which reduce or grind it in the ordinary manner. These rolls are adjusted vertically by the movement of the boxes E on the arms D and laterally by the adjusting-rods G. When it is desired to vary the relations of the rolls it may readily be accomplished by turning either the screws $d^2$ or the hand-nuts $g^2$, or both, according to the variation desired. When it is desired to temporarily part the rolls (thus stopping the grinding) and shut off the feed it is done by moving the device I by means of the handle I', which operates the bar H, which in turn, through the bell-crank levers G', operates the rods G, and thus permits the arms D to move back and the rolls to part. The inner end of the handle I' at the same time operates the rod L, which lifts the arms K', thus partially rotating the shafts K and causing the gates J to close down against the feed-rolls J' and shut off the flow of grain. A reversing of this motion brings all of said parts back into exactly their former position, and the grinding proceeds.

Having thus fully described our said invention, what we claim as new, and desire to secure by Letters Patent, is—

1. The combination, in a roller-mill, of roll-supporting arms D, movable bearings therefor, the rods F and G, provided with adjusting-screws, and springs $F^2$, said bearings being located between said rods, substantially as set forth.

2. The combination, in a roller-mill, of swinging arms supporting one of the rolls of a pair, rods at both ends thereof, which hold said arms and the roll supported thereby toward the other roll of the pair, and springs on the rods at the ends of the arms opposite to the ends which support the roll and beyond the supporting-pivots of said arms, which springs operate to throw the ends of said arms which support the roll and the roll supported thereby outward, thus forcing said roll away from its fellow as far as the rods which hold it inwardly will permit, substantially as set forth.

3. The combination, in a roller-mill, of the swinging roll-supporting arms D, having elongated pivot-openings, the pivot-pins $d$, the adjusting-rods G, the rods F, and the springs F', whereby said arms are adjusted to position and held in said position against fixed stops, and the roll supported thereby is held forward with all the force needed for a grinding pressure, and is at the same time permitted to swing back slightly when any hard substance comes between it and its fellow, all substantially as set forth.

4. The combination, in a roller-mill, of supporting-arms for the bearings for the rolls, the boxes forming said bearings, and means for moving said boxes on said arms, said boxes having portions with spherical surfaces fitting spherical surfaces on the arms, said surfaces having a common center horizontally removed from the center of the rolls, whereby a vertical adjustment of said boxes may be had by a shifting of the box on its seat, these spherical surfaces at the same time obviating any binding action of the boxes on the roll-journals, substantially as set forth.

5. In a roller-mill, the combination of the journal-boxes and supporting-surfaces therefor, said surfaces being struck from a common center, as at $\otimes$, and said boxes being formed to fit said surfaces, whereby a moving of said boxes on said surfaces will vary the relation of said rolls on the plane which passes through both without causing a binding on the roll-journals, substantially as set forth.

6. The combination, in a roller-mill, of the swinging arms D, the rods G, the bell-crank levers G', and the bar H, said bell-crank levers being pivoted to the frame-work by pivots $a$ and to said rods by pivots $g'$, and connected together by said bar, as specified, whereby a movement of the long arms thereof at opposite ends of the same roll in the same line and same direction acts to move the rods G and arms D at opposite ends of the same roll simultaneously to or from the fixed roll, substantially as set forth.

7. The combination, in a roller-mill, of the arms D, the rods G, the bell-crank levers G', the connecting-bar H, and means for operating the same, all constructed, arranged, and operating substantially as shown and specified.

8. The combination of the arms D, the arm-operating rods G, the bar H for connecting said rods, and the device I, having cam-shaped portion $i$, whereby said bar is given a reciprocating movement, and said rods are all operated simultaneously, substantially as set forth.

9. The combination of the feed-gates J, the shafts K, having arms K', and the sliding bar L, whereby both said gates can be moved at once, substantially as set forth.

10. The combination of the feed-gate J, having arms $j'$, with a notch in each, the shaft K, having a projecting lug, $k$, secured thereto, the arms K', and the bar L, adapted to operate said arms, substantially as set forth.

11. The combination of the arm-operating mechanism, the feed-gate-operating mechanism, and the device I, having a cam, $i$, to operate one mechanism, and a handle, I', having a projecting end to operate the other, whereby both mechanisms can be operated simultaneously, and the rolls thus thrown apart from each other and the feed-gates closed at one operation, substantially as set forth.

12. The combination, with the counter-shaft M, of an adjusting mechanism consisting of the devices N, the rods O, and mechanism connecting said rods together, whereby they are operated simultaneously, all substantially as set forth.

13. The combination of the feed-gates, shafts for operating the same, arms K' K' on said shafts on opposite sides of the machine, and a bar, L, having lugs $l'$ $l'$, whereby said arms, shafts, and feed-gates are operated simultaneously, substantially as set forth.

14. The combination of the feed-gate-operating mechanism, the bar L, provided with pivoted catches $l$ $l$, and the handle I, said bar being adapted by means of said pivoted catches to be operated by the inwardly-projecting end of said handle, or to be operated without moving said handle, substantially as set forth.

15. The combination of the feed-gates, their operating-shafts, the arms K' K' on said shafts, the bar L, having lugs $l'$ $l'$, which operate said arms and the pivoted catches $l l$, and the handle I', whereby said bar can be operated by the inwardly-projecting end of said handle I', or is permitted to be operated independently of said handle, substantially as set forth.

16. The combination, with the hopper and feed-gate, of the stops $j^2$ and the arms $j'$, the surfaces whereof come in contact, and are in effect non-yielding during the normal action of the machine, but which are constructed to yield upon the application of additional force and to return to their normal position when said additional force is withdrawn, substantially as set forth.

17. The combination of the hopper, the feed-gate, its arms $j'$, having springs $j^4$, the stop surfaces, and stops $j^2$, substantially as described, and for the purposes specified.

In witness whereof we have hereunto set our hands and seals, at Indianapolis, Indiana, this 30th day of May, A. D. 1882.

DANIEL W. MARMON. [L. S.]
JESSE WARRINGTON. [L. S.]

In presence of—
C. BRADFORD,
C. E. TEST.